United States Patent
Emmert et al.

(10) Patent No.: US 11,273,861 B2
(45) Date of Patent: *Mar. 15, 2022

(54) HYDRAULIC STEERING SYSTEM

(71) Applicant: DEERE & COMPANY, Moline, IL (US)

(72) Inventors: Robert Clayton Emmert, Waverly, IA (US); Troy Schick, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 60 days.

This patent is subject to a terminal disclaimer.

(21) Appl. No.: 16/822,761

(22) Filed: Mar. 18, 2020

(65) Prior Publication Data
US 2020/0216112 A1 Jul. 9, 2020

Related U.S. Application Data

(62) Division of application No. 15/487,569, filed on Apr. 14, 2017, now Pat. No. 10,633,015.

(51) Int. Cl.
| | |
|---|---|
| *B62D 1/22* | (2006.01) |
| *B62D 5/093* | (2006.01) |
| *B62D 5/09* | (2006.01) |

(52) U.S. Cl.
CPC ............. *B62D 1/22* (2013.01); *B62D 5/091* (2013.01); *B62D 5/093* (2013.01)

(58) Field of Classification Search
CPC .......... B62D 1/22; B62D 5/091; B62D 5/093; B62D 3/14
See application file for complete search history.

(56) References Cited

U.S. PATENT DOCUMENTS

| | | |
|---|---|---|
| 4,723,475 A | 2/1988 | Burk |
| 4,809,586 A | 3/1989 | Gage et al. |
| 5,050,696 A | 9/1991 | McGovern et al. |
| 5,960,694 A | 10/1999 | Thomas et al. |
| 6,120,046 A | 9/2000 | Daly |
| 6,539,710 B2 | 4/2003 | Draper |

(Continued)

OTHER PUBLICATIONS

Deere & Company, "Active Command Steering," article (Jul. 25, 2013) 2 pages, http://salesmanual.deere.com/sales/salesmanual/en_NA/tractors/2012/feature/steering_and_brakes/8r_8rt/a . . . .

*Primary Examiner* — Kevin Hurley
*Assistant Examiner* — Michael R Stabley
(74) *Attorney, Agent, or Firm* — Michael Best & Friedrich LLP

(57) ABSTRACT

A method of operating a steering system having a rotatable steering control, a steering actuator having a rod movable along a range of travel, a rotary device coupled to the steering control, and a valve assembly disposed between the rotary device and the steering actuator includes rotating the steering control in a first direction, displacing the rod toward an end of the range of travel, and determining when the rod reaches the end of the range of travel. The method also includes, after determining, actuating the valve assembly from a first position in which the rotary device is not in fluid communication with the steering actuator, to a second position in which the rotary device is in fluid communication with the steering actuator, and inhibiting further rotation of the steering control in the first direction due to back pressure on the rotary device.

20 Claims, 5 Drawing Sheets

(56) References Cited

U.S. PATENT DOCUMENTS

| | | |
|---|---|---|
| 6,560,961 B2 | 5/2003 | Draper et al. |
| 6,625,982 B2 | 9/2003 | Van Den Bossche et al. |
| 7,306,071 B2 | 12/2007 | Harnischfeger et al. |
| 7,677,351 B2 | 3/2010 | Biener |
| 7,913,801 B2 | 3/2011 | Nakamura et al. |
| 7,931,112 B2 | 4/2011 | Gehlhoff |
| 8,157,033 B2 | 4/2012 | Gilbert et al. |
| 8,225,603 B2 | 7/2012 | Novacek et al. |
| 8,272,471 B2 | 9/2012 | Gehlhoff |
| 8,397,858 B2 | 3/2013 | Krahn |
| 9,200,645 B2 | 12/2015 | Krahn |
| 9,227,660 B1 | 1/2016 | Bebernes et al. |
| 9,238,479 B2 | 1/2016 | Smith et al. |
| 9,370,138 B2 | 6/2016 | Bebernes et al. |
| 9,380,737 B2 | 7/2016 | Bebernes et al. |
| 9,421,999 B2 | 8/2016 | Rotole et al. |
| 9,439,341 B2 | 9/2016 | Bebernes et al. |
| 2004/0237518 A1 | 12/2004 | Fenny et al. |
| 2008/0087014 A1 | 4/2008 | Schnick et al. |
| 2017/0072998 A1 | 3/2017 | Krahn |

HYDRAULIC STEERING SYSTEM

CROSS-REFERENCE TO RELATED APPLICATIONS

This application is a divisional of co-pending U.S. patent application Ser. No. 15/487,569, filed Apr. 14, 2017, the entire content of which is incorporated herein by reference.

BACKGROUND

The present disclosure relates to steering systems and more particularly to hydraulic steering systems.

Steer-by-wire systems can allow for software-customizable steering characteristics and a smoother feel in the steering controls. Steer-by-wire systems may have to include redundancies, however, to maintain steering functionality in the event of a failure within the system.

SUMMARY

In one aspect, a steering system includes a user-manipulable steering control, a steering actuator, a pump, and a first valve assembly configured to control a flow of fluid from the pump to the steering actuator in response to manipulation of the steering control. The steering system also includes a rotary device coupled to the steering control. The rotary device is configured to direct fluid in response to manipulation of the steering control. The steering system further includes a second valve assembly movable between a first position in which the rotary device is not in fluid communication with the steering actuator and a second position in which the second valve assembly fluidly communicates the rotary device with the steering actuator.

In another aspect, a steering system includes a steering control, a steering sensor configured to monitor a rotational position of the steering control, and a steering actuator. A first valve assembly is configured to control a flow of fluid to the steering actuator based on feedback from the steering sensor. The steering system also includes a rotary device mechanically coupled to the steering control. The rotary device is configured to direct fluid in response to rotation of the steering control. A second valve assembly is movable between a first position in which the rotary device is not in fluid communication with the steering actuator and a second position in which the second valve assembly fluidly communicates the rotary device with the steering actuator.

In another aspect, a method of operating a steering system, which includes a rotatable steering control, a steering actuator having a rod movable along a range of travel in response to rotation of the steering control, a rotary device coupled to the steering control, and a valve assembly disposed between the rotary device and the steering actuator, includes rotating the steering control in a first direction, displacing the rod toward an end of the range of travel, and determining when the rod reaches the end of the range of travel. The method also includes, after determining, actuating the valve assembly from a first position, in which the rotary device is not in fluid communication with the steering actuator, to a second position, in which the rotary device is in fluid communication with the steering actuator. The method further includes inhibiting further rotation of the steering control in the first direction due to back pressure on the rotary device.

Other aspects of the disclosure will become apparent by consideration of the detailed description and accompanying drawings.

Before any embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

DETAILED DESCRIPTION

Figure 1:
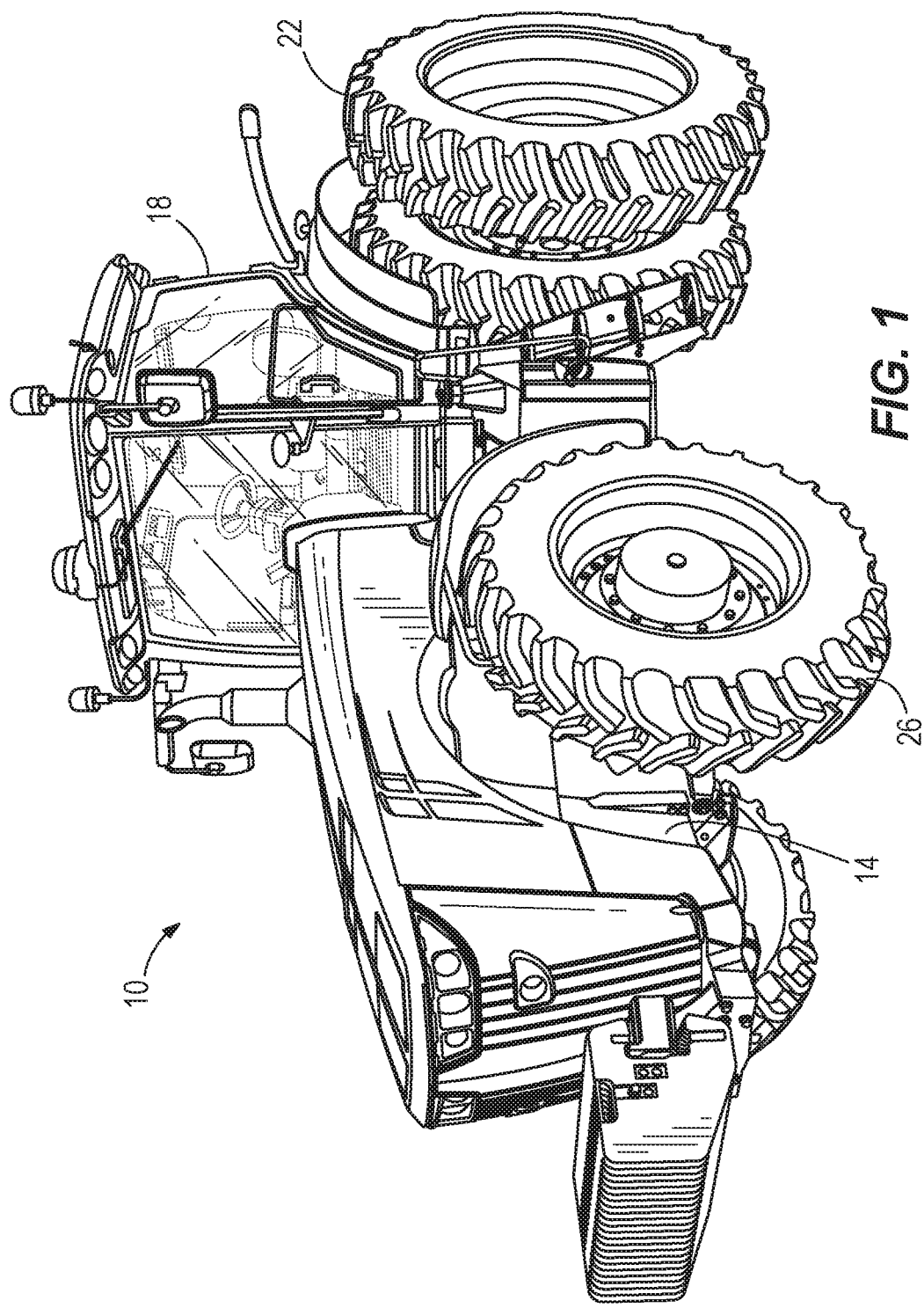
FIG. 1 is a side view of a machine in which the disclosed hydraulic steering system may be implemented.

FIG. 1 illustrates a machine 10, which is a tractor in the illustrated embodiment. The machine 10 includes a chassis 14, a cab 18, rear wheels 22, and front wheels 26. In some embodiments, either or both the rear wheels 22 and the front wheels 26 may be configured as tracks. The machine 10 further includes an engine 30 (FIG. 2) supported on the chassis 14. The rear wheels 22 are drivably coupled to the engine 30 (e.g., via a transmission). In other embodiments, the front wheels 26 or both the front wheels 26 and rear wheels 22 may be drivably coupled to the engine 30.

Figure 2:
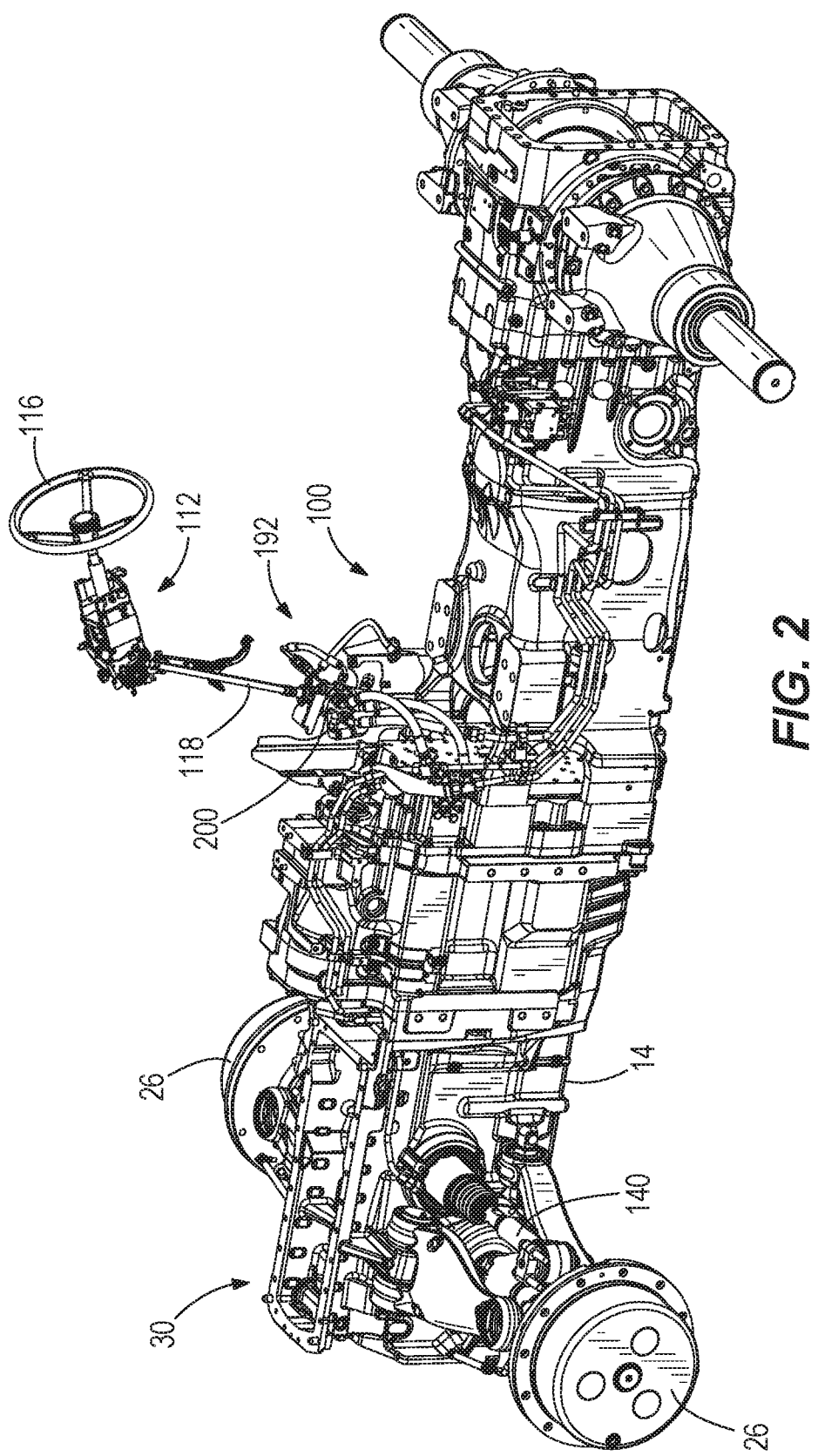
FIG. 2 illustrates a steering system according to one embodiment of the disclosure, incorporated into the machine of FIG. 1.
Figure 3:
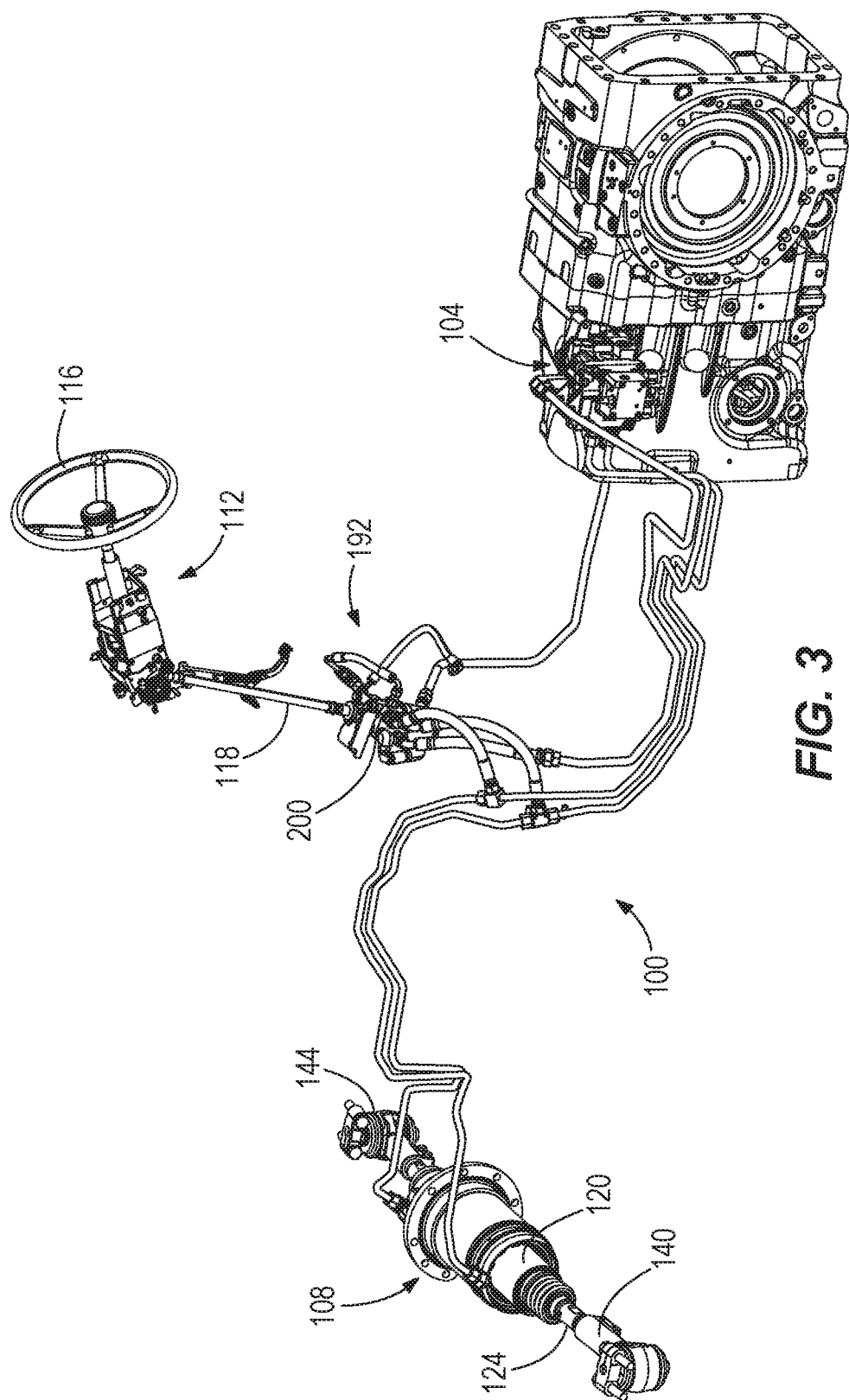
FIG. 3 is a perspective view of the steering system of FIG. 2.
Figure 4:
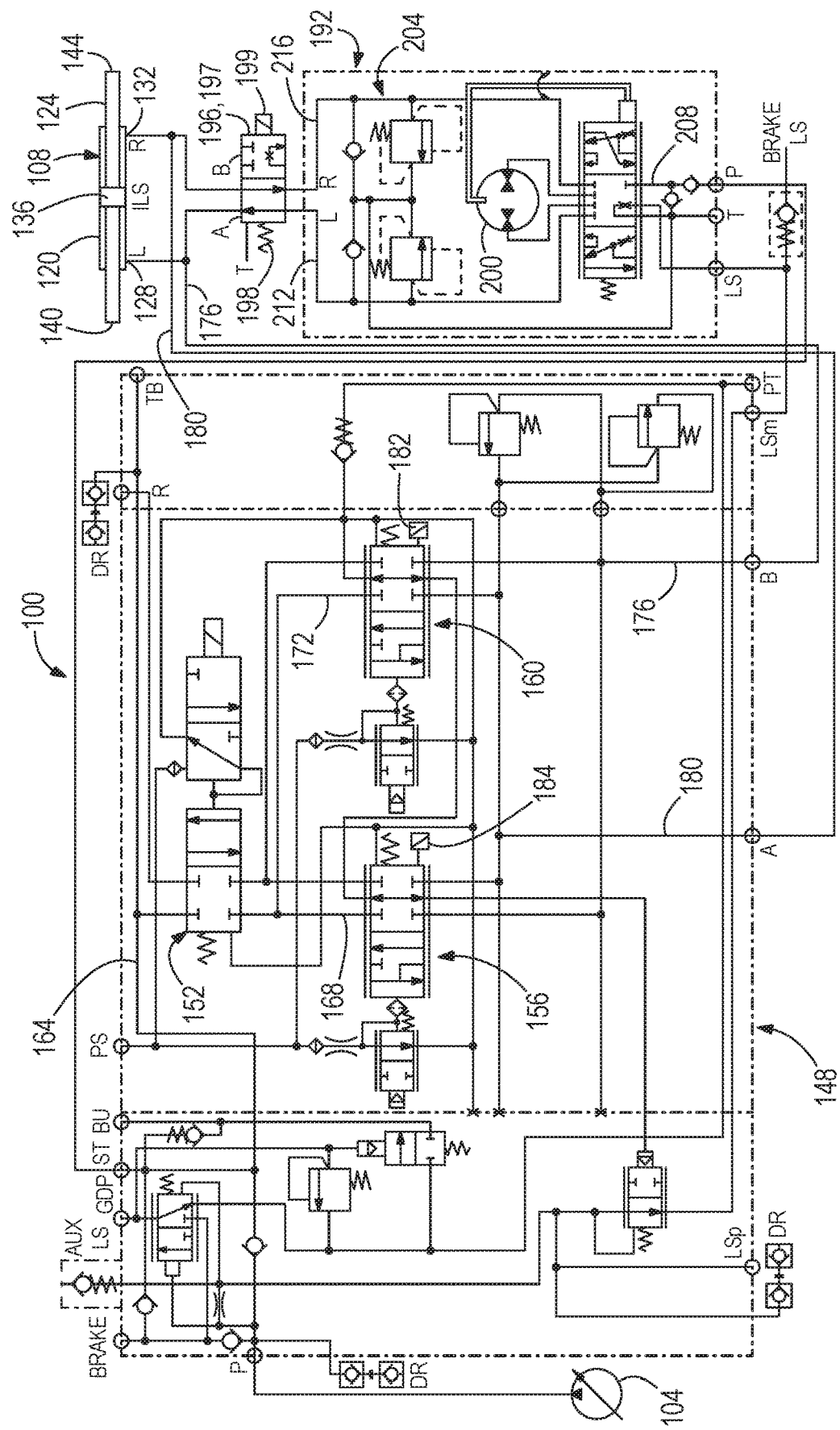
FIG. 4 is a schematic diagram of the steering system of FIG. 2.
Figure 5:
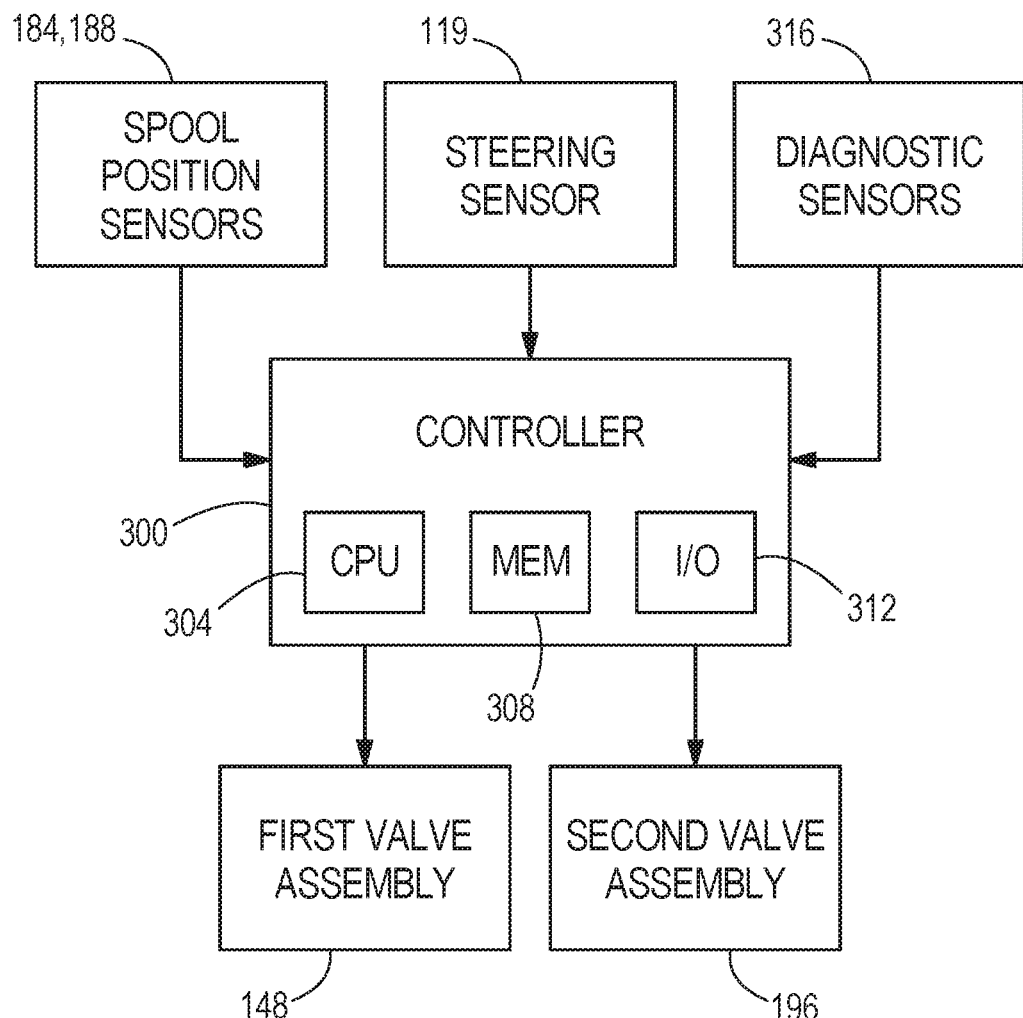
FIG. 5 illustrates a controller of the steering system of FIG. 2.

With reference to FIG. 2-4, the machine 10 further includes a steering system 100. It should be understood that the steering system 100 is not limited in application and can be used in conjunction with any other steerable vehicle. For example, the steering system 100 can be used in other work vehicles, agricultural vehicles, passenger vehicles, and the like. The steering system 100 includes a hydraulic fluid pump 104, which is a variable displacement pump in the illustrated embodiment, and a double-acting hydraulic steering actuator 108 (FIG. 4). The steering system 100 further includes a user-manipulable steering control 112 (FIGS. 2 and 3). In the illustrated embodiment, the steering control 112 includes a steering wheel 116 and a steering column 118 coupled to the steering wheel 116 such that rotation of the steering wheel 116 rotates the steering column 118. In other embodiments, the steering control 112 can include other user-manipulable components in place of the steering wheel 116, such as one or more joysticks, yokes, pedals, levers, and the like. A steering sensor (e.g., an optical encoder, magnetic sensor, etc.) 119 is provided to monitor movement of the steering control 112 (FIG. 5). In the illustrated embodiment, the steering sensor 119 is configured to monitor a rotational position of the steering control 112.

The steering actuator 108 includes a barrel 120 and a rod 124 linearly displaceable along the barrel 120 (FIG. 4). The extent to which the rod 124 is displaceable relative to the barrel 120 defines a range of travel. The barrel 120 has a first or left side inlet 128 and a second or right side inlet 132. A piston 136 on the rod 124 is disposed between the first and second inlets 128, 132. In the illustrated embodiment, a first end 140 of the rod 124 is coupled to the left front wheel 26 and a second end 144 of the rod 124 is coupled to the right front wheel 26. As such, displacement of the rod 124 (e.g., in response to the introduction of pressurized hydraulic fluid through the first inlet 128 or the second inlet 132) may turn the front wheels 26 left or right. In other embodiments, a second steering actuator may be provided and coupled to the rear wheels 22 such that both the front wheels 26 and the rear wheels 22 may be steerable.

Referring to FIG. 4, a first valve assembly 148 is provided to control fluid flow between the pump 104 and the steering actuator 108 during ordinary operation of the steering system 100. The illustrated valve assembly 148 includes a shut-off valve 152 disposed upstream of first and second infinitely variable, solenoid-actuated valve sections 156, 160. The shut-off valve 152 includes an inlet in fluid communication with an outlet of the pump 104 via a line 164 and an outlet in fluid communication with inlets of the first and second valve sections 156, 160 via lines 168 and 172, respectively. An outlet of the first valve section 156 is in fluid communication with the first inlet 128 of the steering actuator 108 via a line 176, and an outlet of the second valve section 160 is in fluid communication with the second inlet 132 of the steering actuator 108 via a line 180. As such, the first and second valve sections 156, 160 can independently regulate the flow of hydraulic fluid from the pump 104 into the first and second inlets 128, 132 of the steering actuator 108. In the illustrated embodiment, sensors 184, 188 (such as spool position sensors) are provided on each of the valve sections 156, 160 to monitor and provide feedback indicative of the operating state the respective valve sections 156, 160 (e.g., the degree to which each valve section 156, 160 is open or closed). In other embodiments, additional or alternative sensors may be provided to monitor various aspects of the steering system 100, such as pressures, flow rates, and the like.

With continued reference to FIG. 4, the steering system 100 further includes a secondary steering subsystem 192 and a second valve assembly 196 disposed between the subsystem 192 and the steering actuator 108. In the illustrated embodiment, the second valve assembly 196 includes a two-position valve 197 movable between a first position B and a second position A. In the second position A, the valve assembly 196 fluidly communicates the secondary steering subsystem 192 with the first and second inlets 128, 132 of the steering actuator 108. In the first position B, the valve assembly 196 isolates the subsystem 192 from the steering actuator 108 such that the subsystem 192 is not in fluid communication with the steering actuator 108. In the illustrated embodiment, the valve assembly 196 includes a spring 198 and a solenoid 199. The valve 197 is biased toward the second position A by a spring 199, and the valve 197 is moved to the first position B when the solenoid 199 is energized. Accordingly, the valve 197 is moved to the second position A when the solenoid 199 is de-energized.

The subsystem 192 includes a rotary device 200 and a relief and check valve circuit 204 (FIG. 4). The rotary device 200 is coupled to the steering control 112 such that movement of the steering control 112 is transmitted to the rotary device 200. In the illustrated embodiment, the rotary device 200 is disposed at an end of the steering column 118 and is mechanically coupled to the steering column 118 (FIG. 3). The rotary device 200 can be directly connected to the steering column 118; alternatively, the rotary device 200 can be mechanically coupled to the steering column 118 via one or more gears, shafts, linkages, cables, and the like. In other embodiments, the rotary device 200 may be directly connected to the steering wheel 116.

In the illustrated embodiment, the rotary device 200 is a rotary diverter valve, such as a hydrostatic steering valve. An inlet of the rotary device 200 is in fluid communication with the pump 104 via a line 208, and outlets of the rotary device 200 are connected to respective lines 212 and 216 (FIG. 4). The rotary device 200 is operable to direct and meter hydraulic fluid into the line 212 or the line 216 depending on the relative angular position of the rotary device 200, which, in the illustrated embodiment, is dependent upon the relative angular position of the steering wheel 116. In other embodiments, the rotary device 200 may be a positive displacement pump, such as a gerotor or gear pump. In such embodiments, the rotary device 200 may have a maximum output less than 200 cubic centimeters per revolution to maintain a relatively compact size. Additionally, in some embodiments, the second valve assembly 196 may have a maximum fluid flow capacity between about 20 and about 40 liters per minute.

With reference to FIG. 5, the steering system 100 further includes a controller 300, which includes a plurality of electrical and electronic components that provide power, operational control, and protection to the components and modules within the controller 300. For example, the controller 300 may include an electronic processor or central processing unit 304 (e.g., a programmable microprocessor, microcontroller, or similar device), non-transitory, machine-readable memory 308, and an input/output interface 312. Software included in the implementation of the steering system 100 can be stored in the memory 308 of the controller 300. The software includes, for example, firmware, one or more applications, program data, filters, rules, one or more program modules, and other executable instructions. The controller 300 is configured to retrieve from memory 308 and execute, among other things, instructions related to the control processes and methods described herein. In other embodiments, the controller 300 may include additional, fewer, or different components. In addition, although the controller 300 is described herein with regard to the steering system 100, the controller 300 may also perform other functions, such as acting as an engine control unit (ECU) for the machine 10.

With continued reference to FIG. 5, the controller 300 is in communication (e.g., via the input/output interface 312) with the spool position sensors 184, 188 on the first and second valve sections 156, 160 of the first valve assembly 148. The controller 300 is also in communication with the steering sensor 119, and one or more diagnostic sensors 316. The diagnostic sensors 316 may include one or more pressure, flow rate, voltage, current, or other sensors for monitoring operation and performance of the steering system 100. The controller 300 is also in communication with the first valve assembly 148 and the second valve assembly 196 for controlling their operation.

During ordinary operation, the pump 104 provides pressurized hydraulic fluid to the first valve assembly 148 (FIG. 4). The controller 300 monitors the steering sensor 119 and operates the first and second valve sections 156, 160 to direct and meter the flow of hydraulic fluid to the first or second inlets 128, 132 of the steering actuator 108 (FIGS. 4 and 5). For example, when the steering wheel 116 is turned to the left, the controller 300 proportionally opens the first valve section 156 based on feedback from the steering sensor 119. This routes hydraulic fluid into the first inlet 128. The hydraulic fluid pressure acts on the piston 136 to displace the rod 124, which turns the front wheels 26. When the steering wheel 116 is turned to the right, the controller 300 proportionally opens the second valve section 160 based on feedback from the steering sensor 119, to route hydraulic fluid into the second inlet 132. The hydraulic fluid pressure acts on the piston 136 to displace the rod 124 in the opposite direction, which turns the front wheels 26 the opposite direction. During ordinary operation, the second valve assembly 196 is in its first position B, such that the subsystem 192, including the rotary device 200, is not in fluid communication with the actuator 108 and therefore does not affect steering. Thus, during ordinary operation, the steering system 100 acts as a steer-by-wire system.

The steering system 100 may reach its maximum steering capacity during ordinary operation. This occurs when the rod 124 reaches an end of its range of travel (representing the maximum degree to which the wheels 26 may be turned right or left), or when the wheels 26 encounter some sort of obstruction, such as a rut or stump, that prevents them from being turned further. In such cases, it may be desirable to provide tactile feedback to the steering control 112 to alert the operator that the steering system 100 has reached its maximum capacity and/or prevent the operator from further turning the steering wheel 116.

In the illustrated embodiment, the controller 300 monitors the spool position sensors 184, 188 to determine when the steering system 100 reaches its maximum capacity. Once the controller 300 determines that the maximum steering capacity has been reached, it actuates the second valve assembly 196 (e.g., by de-energizing the solenoid 199) to move the valve 197 to the second position A. This fluidly communicates the rotary device 200 with the steering actuator 108. Because the rotary device 200 will be unable to direct additional hydraulic fluid into the actuator 108 in the direction for which maximum steering capacity has been reached, the rotary device 200 will provide tactile feedback to the steering control 112 via its mechanical connection with the steering control 112. Thus, in the illustrated embodiment, the subsystem 192 and the second valve assembly 196 function as an end stop that signals to the operator that maximum steering capacity has been reached and that inhibits further rotation of the steering wheel 116.

The subsystem 192 in the illustrated embodiment can also provide backup power steering support in the event of a failure condition within the first valve assembly 148. During operation, the controller 300 monitors the diagnostic sensors 316 to determine if a failure condition has occurred. If a failure condition occurs, the controller 300 actuates the second valve assembly 196 (e.g., by de-energizing the solenoid 199) to move the valve 197 to the second position A. This fluidly communicates the rotary device 200 with the steering actuator 108. The rotary device 200 then directs and meters a flow of hydraulic fluid into the first or second inlets 128, 132 of the steering actuator 108, depending on the relative angular position of the rotary device 200, which, in the illustrated embodiment, is dependent upon the relative angular position of the steering wheel 116.

Various features of the disclosure are set forth in the following claims.

What is claimed is:

1. A method of operating a steering system including a rotatable steering control, a steering actuator having a rod movable along a range of travel in response to rotation of the steering control, a rotary device coupled to the steering control, and a valve assembly disposed between the rotary device and the steering actuator, the method comprising:
    rotating the steering control in a first direction;
    displacing the rod toward an end of the range of travel;
    determining when the rod reaches the end of the range of travel;
    after determining, actuating the valve assembly from a first position, in which the rotary device is not in fluid communication with the steering actuator, to a second position, in which the rotary device is in fluid communication with the steering actuator; and
    inhibiting further rotation of the steering control in the first direction due to back pressure on the rotary device.

2. The method of claim 1, wherein the rotary device is a gear pump.

3. The method of claim 2, wherein the gear pump has a maximum output less than two hundred cubic centimeters per rotation of the steering control.

4. The method of claim 1, wherein the rotary device is mechanically coupled to the steering control.

5. The method of claim 1, wherein determining when the rod reaches the end of the range of travel includes receiving feedback from a spool position sensor.

6. The method of claim 1, further comprising actuating an electronic valve assembly to control a flow of fluid from a pump to the steering actuator in response to rotating the steering control in the first direction to displace the rod toward the end of the range of travel.

7. The method of claim 6, further comprising actuating the valve assembly from the first position to the second position in response to a failure condition.

8. A method of operating a steering system including a rotatable steering control, a steering actuator having a rod movable along a range of travel in response to rotation of the steering control, a rotary device coupled to the steering control, and a valve assembly disposed between the rotary device and the steering actuator, the method comprising:
    rotating the steering control in a first direction;
    displacing the rod toward an end of the range of travel;
    determining when the rod reaches the end of the range of travel;
    after determining, actuating the valve assembly from a first position, in which the rotary device is not in fluid communication with the steering actuator, to a second position, in which the rotary device is in fluid communication with the steering actuator; and
    inhibiting further rotation of the steering control in the first direction due to back pressure on the rotary device,
    wherein the rotary device is a rotary diverter valve.

9. A method of operating a steering system including a rotatable steering control, a steering actuator having a rod movable along a range of travel in response to rotation of the steering control, a rotary device coupled to the steering control, and a valve assembly disposed between the rotary device and the steering actuator, the method comprising:
    rotating the steering control in a first direction;
    actuating an electronic valve assembly to control a flow of fluid from a pump to the steering actuator in response to rotating the steering control in the first direction to displace the rod toward an end of the range of travel;
    actuating the valve assembly from a first position, in which the rotary device is not in fluid communication with the steering actuator, to a second position, in which the rotary device is in fluid communication with the steering actuator, if a failure condition occurs, wherein the failure condition corresponds with failure of the electronic valve assembly;
    determining when the rod reaches the end of the range of travel;
    after determining, actuating the valve assembly from the first position to the second position; and
    inhibiting further rotation of the steering control in the first direction due to back pressure on the rotary device.

10. A method of operating a steering system including a steering control, a steering actuator having a rod movable along a range of travel, and a rotary device mechanically coupled to the steering control, the method comprising:
- manipulating the steering control;
- actuating a first valve assembly to direct fluid to the steering actuator in response to manipulating the steering control;
- displacing a rod of the steering actuator toward an end of the range of travel in response to actuating the first valve assembly;
- determining when the rod reaches the end of the range of travel; and
- actuating a second valve assembly from a first position to a second position in response to the rod reaching the end of the range of travel,
- wherein the second valve assembly is disposed fluidly between the rotary device and the steering actuator such that a fluid flow from the rotary device bypasses the steering actuator when the second valve assembly is in the first position, and the second valve assembly directs the fluid flow from the rotary device to the steering actuator when the second valve assembly is in the second position.

11. The method of claim 10, wherein the rotary device is a gear pump.

12. The method of claim 11, wherein the gear pump has a maximum output less than two hundred cubic centimeters per rotation of the steering control.

13. The method of claim 10, wherein the rotary device is a rotary diverter valve.

14. The method of claim 10, wherein determining when the rod reaches the end of the range of travel includes receiving feedback from a spool position sensor.

15. The method of claim 10, wherein the first valve assembly includes a first valve section fluidly coupled to a first side of the steering actuator and a second valve section fluidly coupled to a second side of the steering actuator.

16. The method of claim 10, further comprising actuating the second valve assembly from the first position to the second position in response to a failure condition.

17. The method of claim 16, wherein the failure condition corresponds with failure of the first valve assembly.

18. The method of claim 10, wherein manipulating the steering control includes rotating the steering control.

19. The method of claim 18, wherein the rotary device is coupled for co-rotation with the steering control.

20. The method of claim 19, wherein rotating the rotary device positively displaces fluid to generate the fluid flow from the rotary device.

* * * * *